US009039000B2

(12) United States Patent
Smith

(10) Patent No.: US 9,039,000 B2
(45) Date of Patent: May 26, 2015

(54) LIFT DEVICE FOR POWER TOOL

(75) Inventor: Darrin E. Smith, Innisfil (CA)

(73) Assignee: JessEm Products Limited, Barrie (CA)

( * ) Notice: Subject to any disclaimer, the term of this patent is extended or adjusted under 35 U.S.C. 154(b) by 280 days.

(21) Appl. No.: 13/614,177

(22) Filed: Sep. 13, 2012

(65) Prior Publication Data

US 2013/0062824 A1 Mar. 14, 2013

Related U.S. Application Data

(60) Provisional application No. 61/534,686, filed on Sep. 14, 2011.

(51) Int. Cl.

| | |
|---|---|
| ***B23Q 3/00*** | (2006.01) |
| ***B23C 3/00*** | (2006.01) |
| ***B27C 5/00*** | (2006.01) |
| ***B25H 1/00*** | (2006.01) |
| *B23Q 1/25* | (2006.01) |

(52) U.S. Cl.
CPC ...................................... *B25H 1/005* (2013.01)

(58) Field of Classification Search
USPC .......... 269/292, 136–138, 291, 900; 409/229, 409/182, 132; 144/136.1, 135.2, 154.5
See application file for complete search history.

(56) References Cited

U.S. PATENT DOCUMENTS

| | | | | |
|---|---|---|---|---|
| 4,179,231 | A * | 12/1979 | Hadden | 408/112 |
| 4,281,694 | A * | 8/1981 | Gorman | 144/154.5 |
| 4,599,927 | A * | 7/1986 | Eccardt et al. | 83/473 |
| 4,749,013 | A * | 6/1988 | Ducate, Sr. | 144/145.1 |
| 4,848,308 | A * | 7/1989 | Hoppe et al. | 125/7 |
| 5,431,206 | A * | 7/1995 | McAllister | 144/286.1 |
| 6,505,659 | B1 * | 1/2003 | Hummel | 144/135.2 |
| 6,550,154 | B1 | 4/2003 | Smith | |
| 6,739,066 | B2 | 5/2004 | Smith | |
| 7,108,463 | B2 * | 9/2006 | Hummel | 409/182 |
| 8,020,593 | B2 * | 9/2011 | Hummel | 144/136.1 |
| 8,146,630 | B2 * | 4/2012 | Hummel | 144/371 |
| 8,282,323 | B2 * | 10/2012 | Hummel | 409/229 |
| 8,485,766 | B2 * | 7/2013 | Hummel | 409/229 |
| 2005/0072490 | A1 * | 4/2005 | Baber | 144/136.95 |
| 2010/0239382 | A1 * | 9/2010 | Hummel | 409/132 |

FOREIGN PATENT DOCUMENTS

WO WO 2008041206 A1 * 4/2008 ............... B25H 3/00

OTHER PUBLICATIONS

JessEm Tool Company, MastRLift™ II User Manual Model #02120, 02121, 11 pages, Barrie, Ontario, Canada.

* cited by examiner

*Primary Examiner* — Lee D Wilson
*Assistant Examiner* — Alvin Grant
(74) *Attorney, Agent, or Firm* — Senniger Powers LLP

(57) ABSTRACT

A lift device for selectively adjusting a vertical position of a power tool relative to a working surface of a plate of a work bench includes a carriage assembly securable to an underside of the plate. The carriage assembly includes a securement mechanism selectively adjustable for interchangeably securing a plurality of power tools of different cross-sectional dimensions to the carriage assembly. A drive assembly selectively moves the securement mechanism upward and downward relative to the plate to adjust the vertical position of the power tool relative to the working surface when the power tool is secured to the carriage assembly. A drive-locking mechanism selectively locks the drive assembly. The drive-locking mechanism includes a cam lock for selectively engaging the drive shaft to inhibit rotation of the drive shaft.

20 Claims, 15 Drawing Sheets

LIFT DEVICE FOR POWER TOOL

FIELD OF THE DISCLOSURE

The present disclosure generally relates to a lift device for adjusting a vertical position of a power tool.

BACKGROUND

Power tools, such as saws and routers, are commonly mounted beneath the top or working surface of a work bench. The blade of the saw or the bit of the router projects through an opening in the working surface and cuts the work piece which rests on the working surface. Typically, the power tool may be secured to a lift device that allows a user to selectively adjust the vertical position of the power tool relative to the working surface of the work bench.

SUMMARY

In one aspect, a lift device for selectively adjusting a vertical position of a power tool relative to a working surface of a plate of a work bench generally comprises a carriage assembly securable to an underside of the plate. The carriage assembly includes a securement mechanism configured to be disposed below the plate when the carriage assembly is secured to the plate. The securement mechanism is selectively adjustable for interchangeably securing a plurality of power tools of different cross-sectional dimensions to the carriage assembly. A drive assembly is adapted for selectively moving the securement mechanism upward and downward relative to the plate to adjust the vertical position of the power tool relative to the working surface when the power tool is secured to the carriage assembly.

In another aspect, a lift device for a power tool generally comprises a plate having an upper surface and a tool aperture extending from the upper surface through the plate, and a carriage assembly secured to the plate. The carriage assembly includes a securement mechanism disposed below the plate. The securement mechanism is selectively adjustable for interchangeably securing a plurality of power tools of different cross-sectional dimensions to the carriage assembly below the tool aperture. A drive assembly of the carriage assembly is adapted for selectively moving the securement mechanism upward and downward relative to the plate to adjust a vertical position of a power tool relative to the tool aperture when the power tool is secured to the carriage assembly.

In yet another aspect, a lift device for a power tool generally comprises a plate having an upper surface and a tool aperture extending from the upper surface through the plate. A carriage assembly is secured to the plate. The carriage assembly includes a securement mechanism disposed below the plate for securing the power tool to the carriage assembly below the tool aperture. A drive assembly includes a rotatable drive shaft coupled to the securement mechanism for selectively moving the securement mechanism upward and downward relative to the plate to adjust a vertical position of the power tool relative to the tool aperture when the power tool is secured to the carriage assembly. A drive-locking mechanism is adapted for selectively locking the drive assembly. The drive-locking mechanism includes a cam lock for selectively engaging the drive shaft to inhibit rotation of the drive shaft.

BRIEF DESCRIPTION OF THE DRAWINGS

Corresponding reference characters indicate corresponding parts throughout the drawings.

DETAILED DESCRIPTION OF THE DRAWINGS

Figure 1:
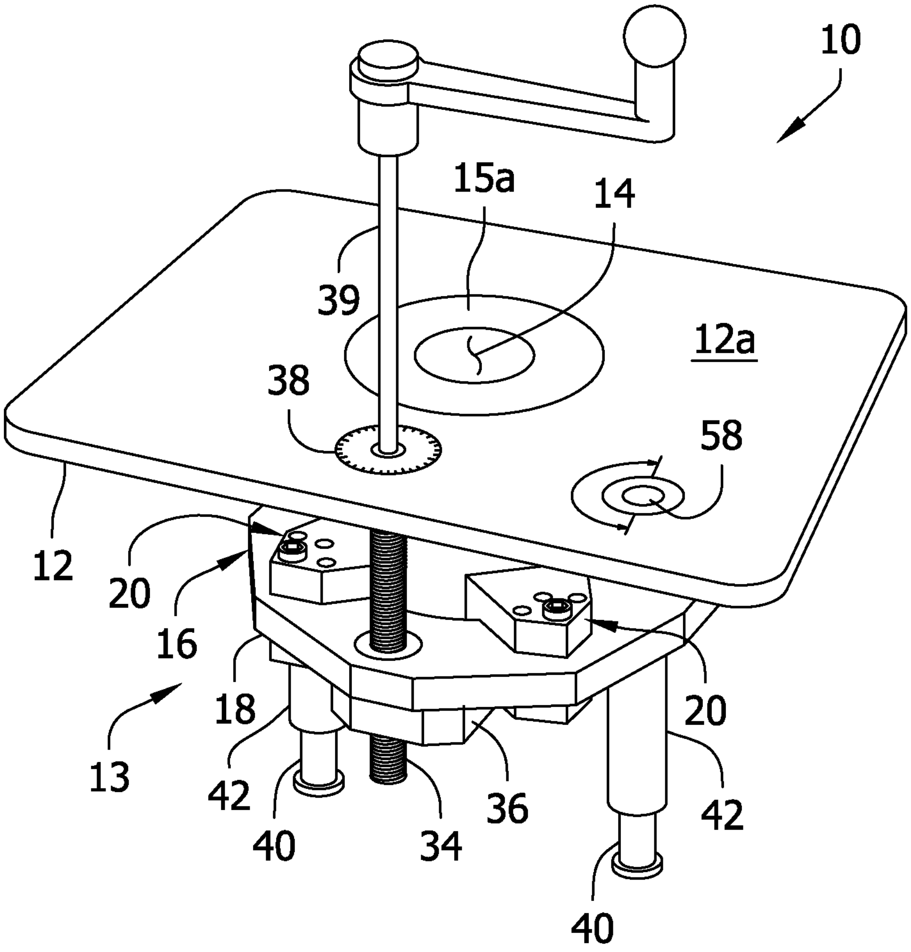
FIG. 1 is a perspective of one embodiment of a lift device.
Figure 9:
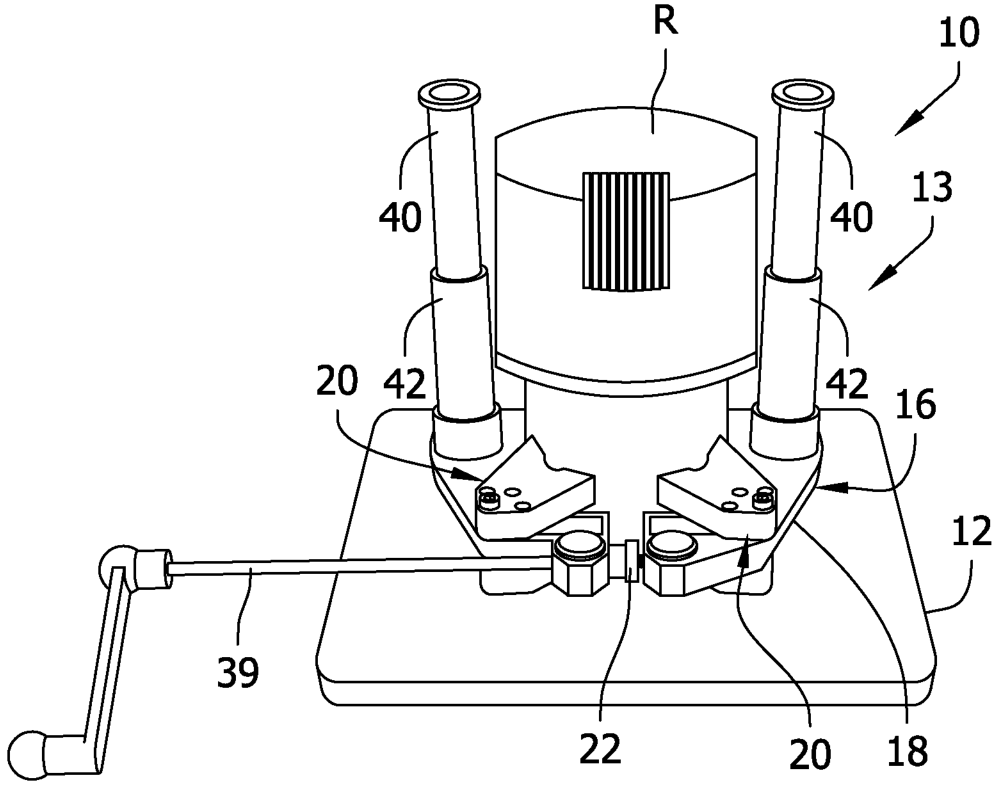
FIG. 9 is a bottom perspective of the lift device including a router secured thereto.

Referring to FIG. 1, one embodiment of a lift device for adjusting a vertical position of a power tool is generally indicated at reference numeral 10. As shown in FIG. 9, the illustrated lift device 10 is configured for use with a router power tool R, i.e., a router, although it is understood that in other embodiments the lift device may be configured for use with a different type of power tool, such as a power saw. The lift device 10 includes a plate 12 defining an upper working surface 12*a* on which a piece of work (not illustrated) may be placed, and a carriage assembly, generally indicated at 13, secured to the plate. The carriage assembly 13 is selectively movable upward and downward relative to the upper working surface 12*a*, and the router R is securable to the carriage assembly to thereby allow a user to move the router to a selected vertical position relative to the working surface causing more or less of a router bit (not shown) to project above the upper working surface.

Figure 2:
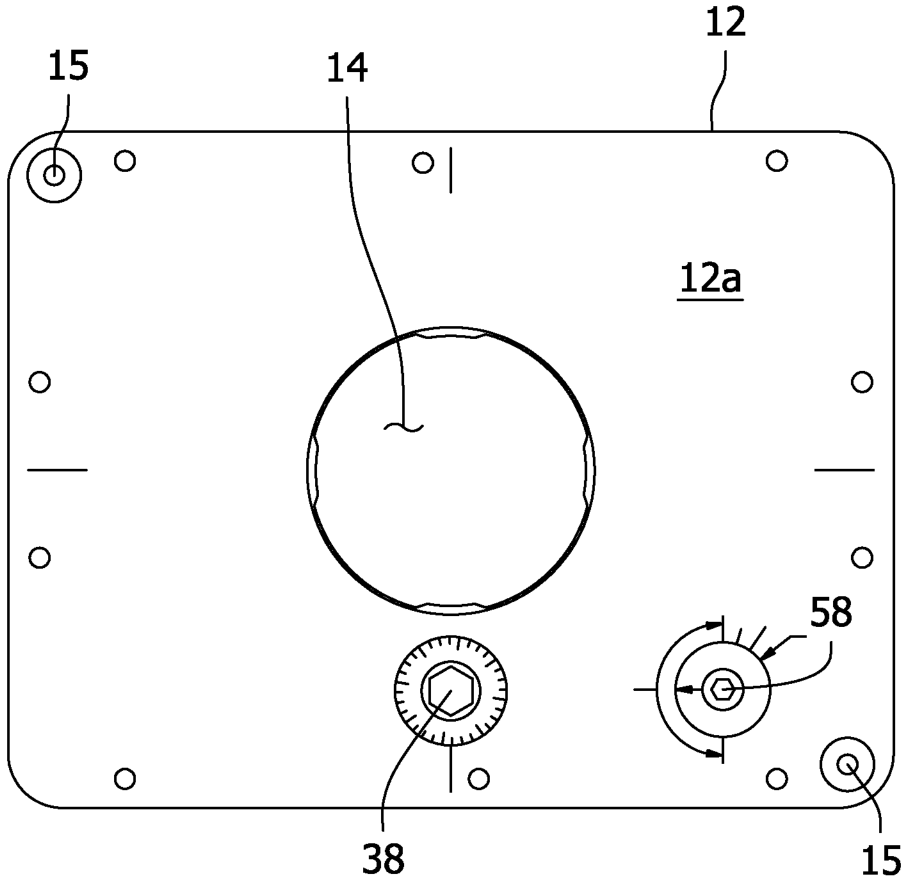
FIG. 2 is top plan view of the lift device.

Referring to FIGS. 1 and 2, the plate 12 has an tool aperture 14 through which the bit of the router R extends. The illustrated lift device 10 is configured for securement to a work bench (not shown), as is generally known in the art, so that the plate 12 is received in an opening in a working surface of the work bench, and the working surface 12*a* of the plate 12 is generally flush with the working surface of the bench. In another embodiment, the plate 12 may be larger and comprise the working plate and the working surface of the work bench. The plate 12 may include other components and devices secured thereto.

In the illustrated embodiment, table attachment openings 15 (FIG. 2) are provided in the plate 12 for receiving bolts (i.e., fasteners; not shown) to secure the lift device 10 to the work bench. The lift device 10 may also include one or more insert rings 15*a* (see FIG. 1, illustrating one insert ring) that are securable to the plate 12 within the tool aperture 14. The plate 12 may be of other configurations, and the lift device 10 may be securable to the work bench in other ways without departing from the scope of the present invention.

Referring to FIGS. 1 and 3-9, the carriage assembly 13 includes a clamping device (broadly, a securement device), generally indicated at 16, for securing the router R to the carriage assembly below the tool aperture 14. The clamping device 16 includes a C-shaped compression ring 18 (FIGS. 1, 3 and 5B), and a plurality of (e.g., four) clamping blocks, generally indicated at 20 (FIGS. 3, 4 and 6A-6C), secured to and spaced apart around the compression ring. A tensioning component 22, e.g., a bolt (FIGS. 3-5A), connects opposing free ends 18*a*, 18*b* of the compression ring 18 to one another. The compression ring 18 is biased to an open configuration, in which the opposing free ends 18*a*, 18*b* are spaced apart from one another to allow the router R to be inserted in the clamping device 16 so that the clamping device surrounds the router, and a closed, clamping configuration, in which the opposing free ends are moved toward one another such that the clamping blocks engage the router and secure it to the clamping device, as shown in FIG. 9.

Figure 4:
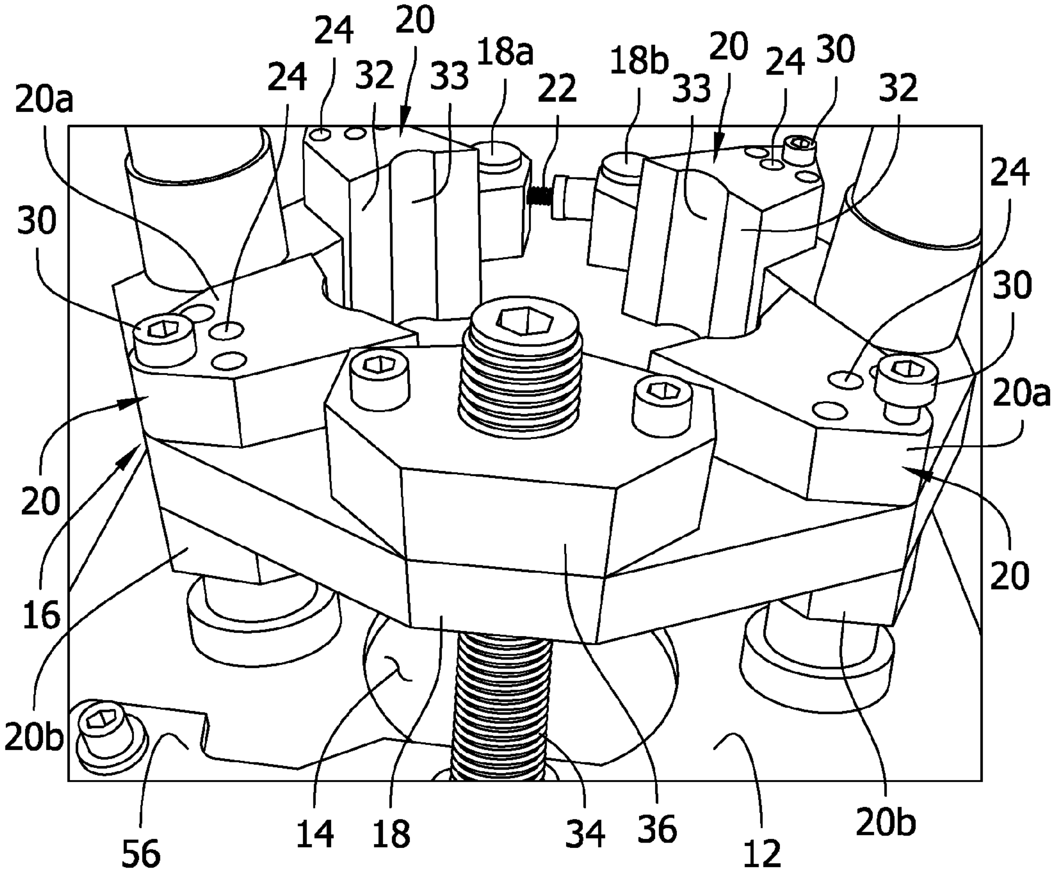
FIG. 4 is an enlarged, fragmentary view FIG. 3.
Figure 5A:
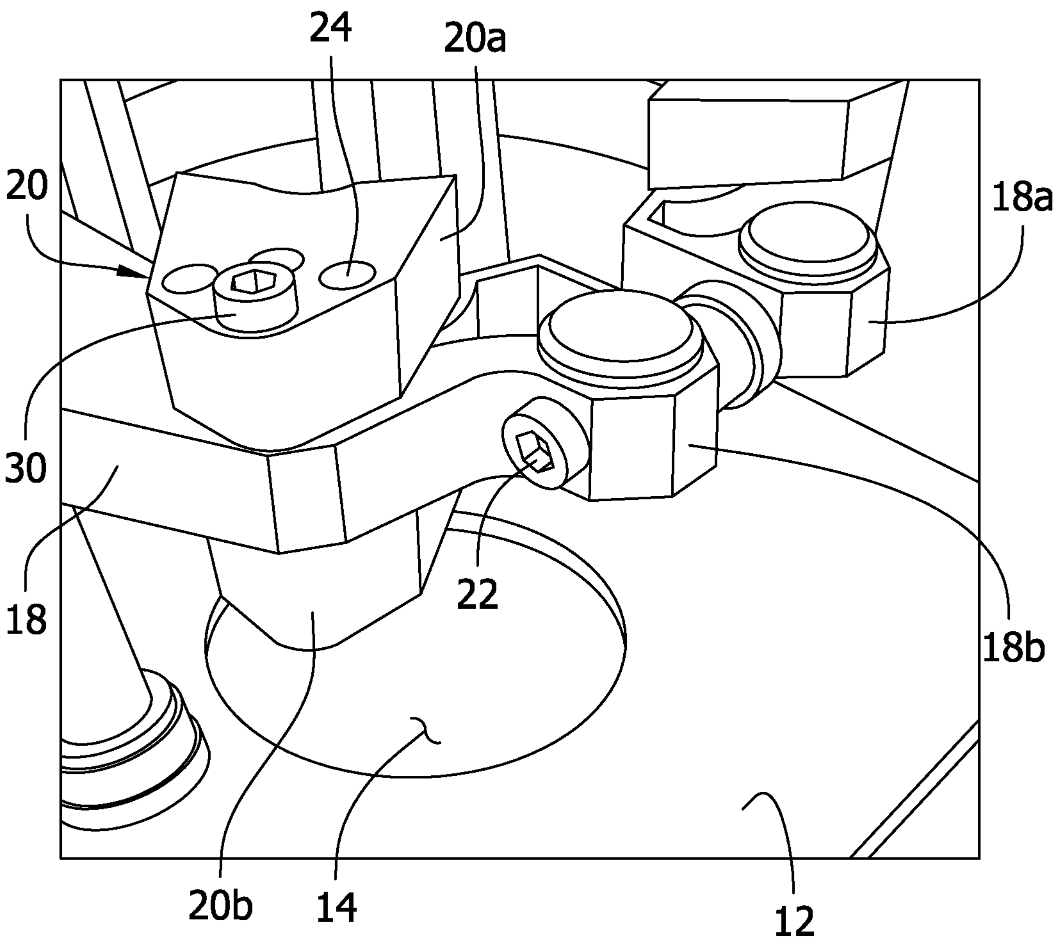
FIG. 5A is another enlarged, fragmentary view of FIG. 3.
Figure 5B:
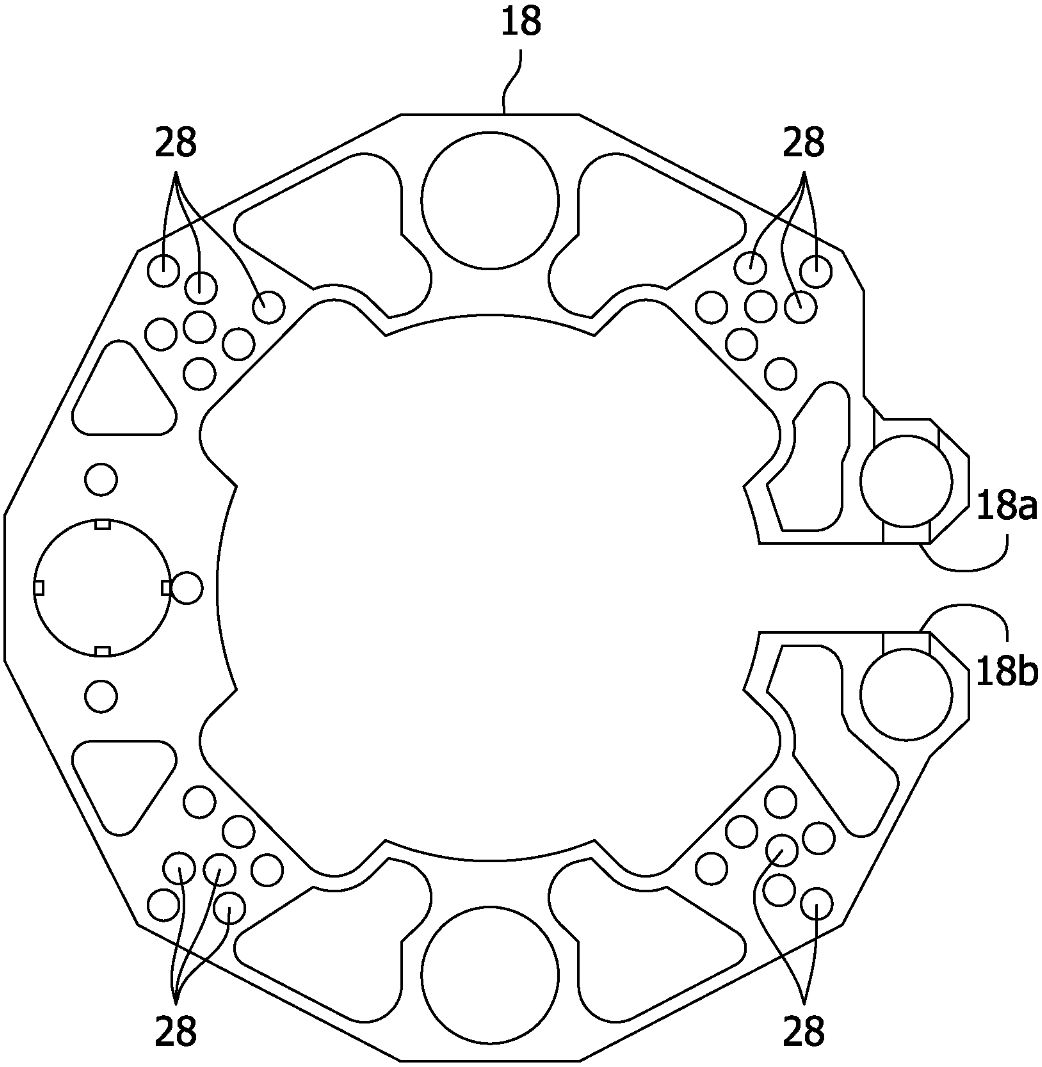
FIG. 5B is a top plan of a compression ring of a clamping device of the lift device.
Figure 6A:
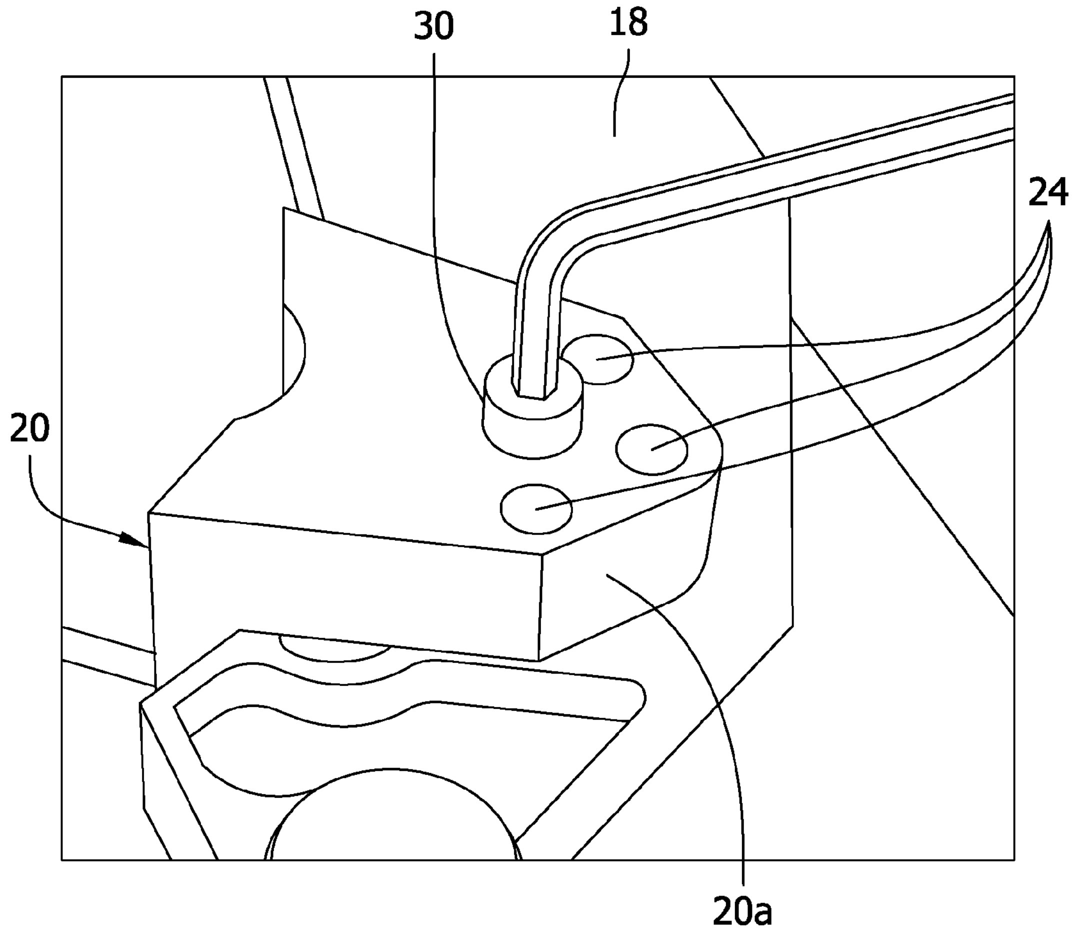
FIG. 6A is an enlarged perspective of a clamping block secured to the compression ring.

In the illustrated embodiment (FIGS. 6A-6C), each clamping block 20 is generally C-shaped having opposing upper and lower portions 20*a*, 20*b*, and a slot 20*c* therebetween. The slot 20*c* is sized and shaped to receive the compression ring 18 therein so that the block 20 is capable of resting on the compression ring. The upper portion 20*a* includes plurality of clamping block through-bores 24 (broadly, openings; labeled 1-4 in FIG. 8), each of which is aligned with a corresponding clamping block threaded-bore 25 (broadly, an opening; only one shown in FIG. 8) in the lower portion 20*b*. Referring to FIG. 5B, the compression ring 18 has four sets of plurality of compression ring through-bores 28 (broadly, openings; one set shown in FIG. 7 and labeled A-G), each of which is selectively alignable with pairs of the aligned clamping block through-bores 24 and threaded-bores 25 when the compression ring 18 is received in the slot 20*c* of a corresponding clamping block 20. Through this configuration, the position of each of the clamping blocks 20 on the compression ring 18 is selectively adjustable, for reasons explained in detail below. Each clamping block 20 is secured to the compression ring 18 by a removable fastener 30 (e.g., shoulder bolt; FIGS. 4, 5A, and 6A) extending through the aligned clamping block and compression ring through-bores 24, 28, respectively, and threaded into the aligned clamping block threaded-bore 25. As shown in FIG. 6A, in one example a tool (e.g., a hexagonal wrench) is used to loosen and tighten the fasteners 30.

Using the plurality of pairs of aligned clamping block bores 24, 25 and the sets of compression ring through-bores 28, the position of each of the clamping blocks 20 on the compression ring 18 is selectively adjustable so that the clamping device 16 can accommodate a plurality of different types and/or brands of routers having different cross-sectional dimensions (e.g., circumferences). That is, the clamping device 16 is selectively adjustable for interchangeably securing a plurality of power tools of different cross-sectional dimensions to the carriage assembly 13 below the tool aperture 14. Broadly, by adjusting the position of the clamping blocks 20 on the compression ring 18, an effective internal circumference of the clamping device 16 is changed so that the clamping device will effectively secure routers R having different cross-sectional dimensions (e.g., circumferences) to the carriage assembly 13.

Figure 6B:
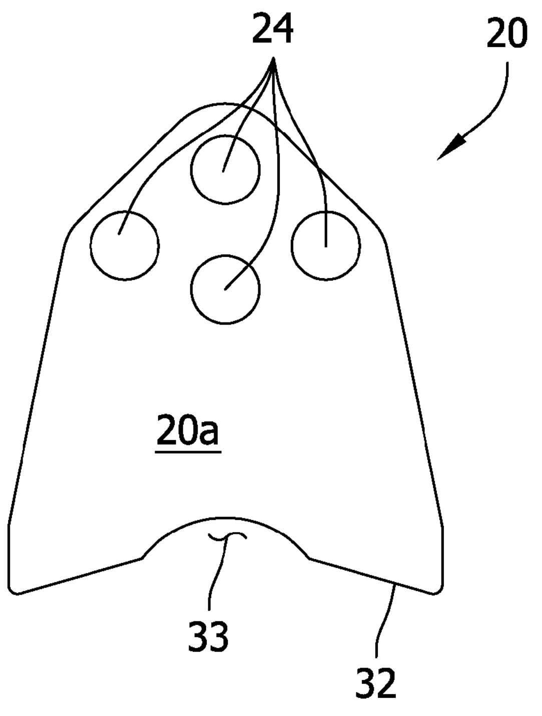
FIG. 6B is a top plan of the clamping block removed from the compression ring.
Figure 6C:
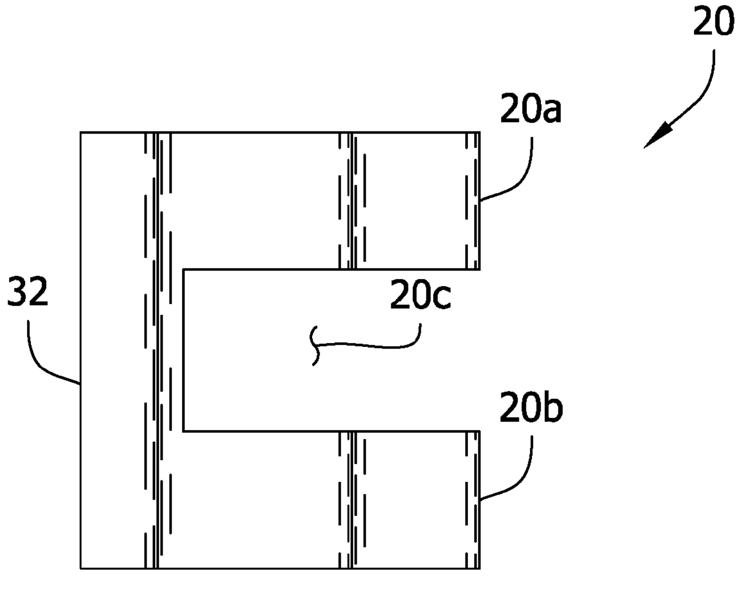
FIG. 6C is a right side elevation of the clamping block of FIG. 6B.
Figure 8:
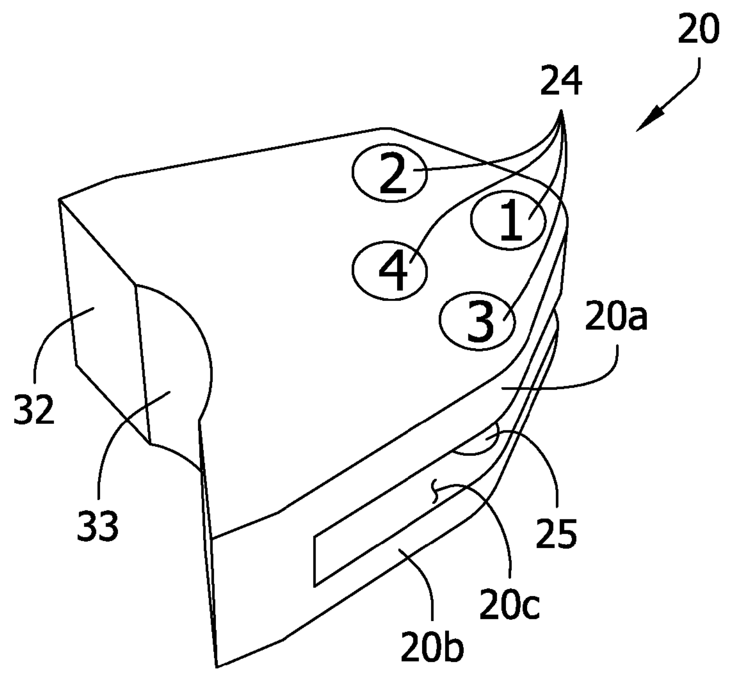
FIG. 8 is a perspective of the clamping block of FIG. 6B.

In addition to accommodating cross-sectional dimensions (e.g., sizes) of the plurality of different types or brands of power tools, the clamping device 16 is configured to accommodate different shapes (e.g., cross-sectional shapes) of the different types or brands of power tools. Referring to FIGS. 6B and 8, in the illustrated embodiment, engagement surfaces 32 of the clamping blocks 20 (i.e., the surfaces that engage the router R) and the locations of the respective clamping block bores 24 and compression ring though-bores 28 are configured to accommodate the different shapes of the plurality of different types or brands of routers R, such as those routers listed in the "Router Chart." For example, some known routers, such as the PORTER-CABLE® 7518 and the PORTER CABLE® 690—each available from PORTER-CABLE® of Jackson, Tenn.—have four short pins extending outward from exterior surfaces thereof. The illustrated clamping blocks 20 have centrally located, arcuate cutouts or recesses 33 formed in the engagement surfaces 32 to provide clearances for the short pins on the routers so that the engagement surfaces make sufficient frictional engagement with the exterior surface of the router to secure the router to the carriage assembly 13.

Figure 14:
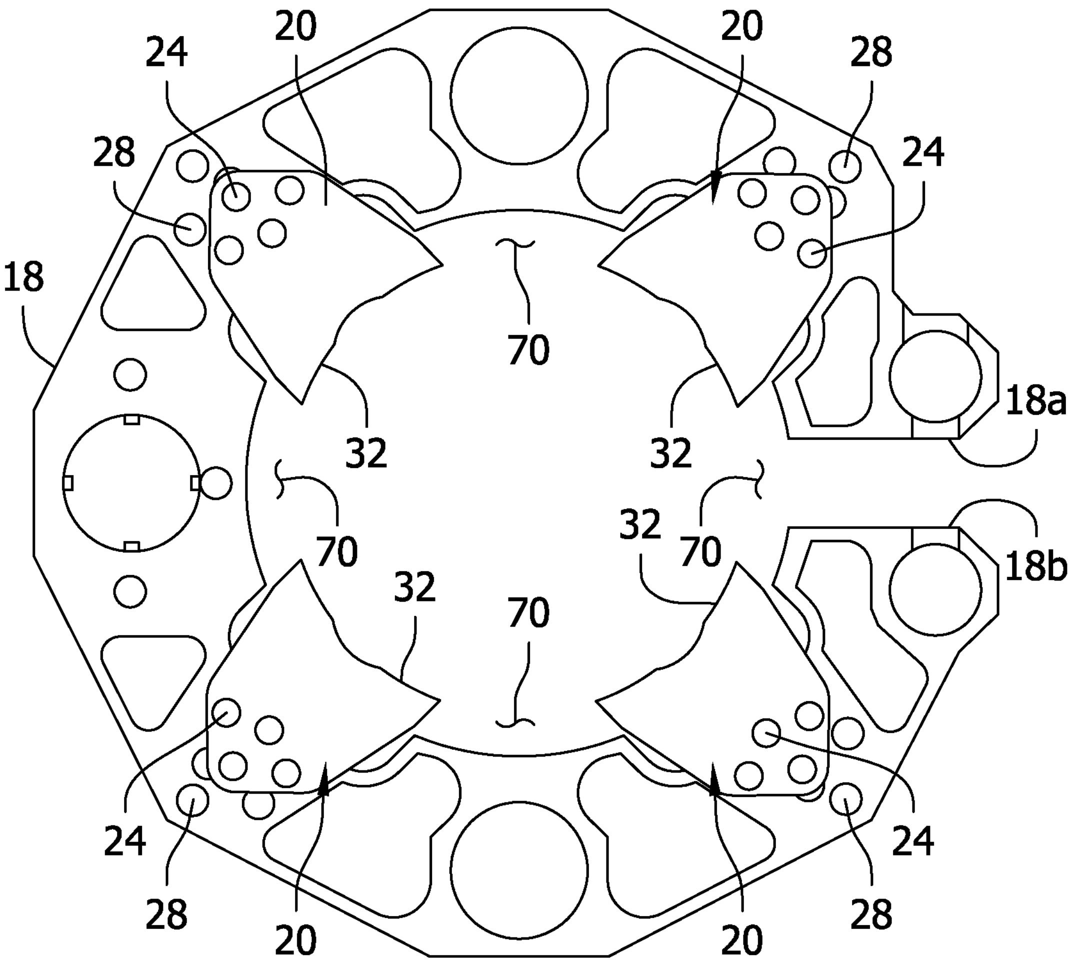
FIG. 14 is a top plan of the compression ring with the clamping blocks secured thereto.

Moreover, some known routers have a gear rack (not shown) mounted on the exterior of the router. For example, the Milwaukee® 5615, 5615, and 5619—each available from Milwaukee Electric Tool Corporation of Brookfield, Wis.—among other types and brands of routers, include such gear racks. Accordingly, as shown in FIG. 14, in at least some positions of the illustrated clamping blocks 20, clearance gaps 70 are defined between adjacent clamping blocks. The clearance gaps 70 provided clearances for the gear rack of the router so that the engagement surfaces 32 sufficient frictional engagement with the exterior surface of the router to secure the router to the carriage assembly 13. The clamping device 10 may be other configurations to accommodate other shapes of different types and brands of routers without.

Figure 7:
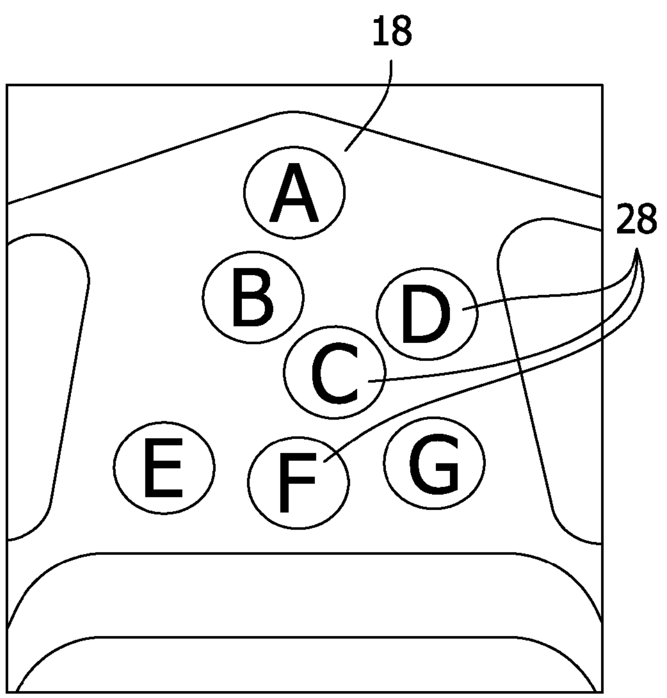
FIG. 7 is an enlarged, fragmentary view of the compression ring showing compression ring through-bores.

In one embodiment, the user may be provided with a chart and diagram(s) detailing, for each provided router type, the pair of aligned clamping block bores 24 and the compression ring through-bore 28 in which the fastener 30 should be inserted and secured. For example, FIG. 7 is an exemplary diagram labeling the compression ring through bores as letters A-G; FIG. 8 is an exemplary diagram labeling the clamping block through-bores as numerals 1-4; and the below table, labeled Router Chart, is an exemplary chart listing selected router types and associating each router type with a combination of a clamping block through-bore and a compression ring through-bore.

| Router Chart | |
|---|---|
| Porter-Cable ® 7518 | A1 |
| Porter-Cable ® 690/890, Bosch ® 1617/1618, DeWalt ® 610/618, Craftsman ® 17543/17540/28190 | F4 |
| Makita ® 1101 | C1 |
| Hitachi ® M12VC/KM12VC | E2 |
| Milwaukee ® 5626 | D3 |
| Milwaukee ® 5615/5616/5619 | G3 |
| Rigid ® R29302 | B1 |

Thus, using the exemplary diagrams and the below table, to secure a PORTER-CABLE® 7518 router to the carriage assembly 13, for example, the user aligns the compression ring through-bore labeled "A" with the clamping block through-bore labeled "1", and then the user inserts the fastener 30 into the selected aligned through-bores and threads the fastener into the aligned clamping block threaded-bore. The clamping device 16 can be adjusted to accommodate other router brands and types using the diagrams and the tables in a similar fashion.

Figure 3:
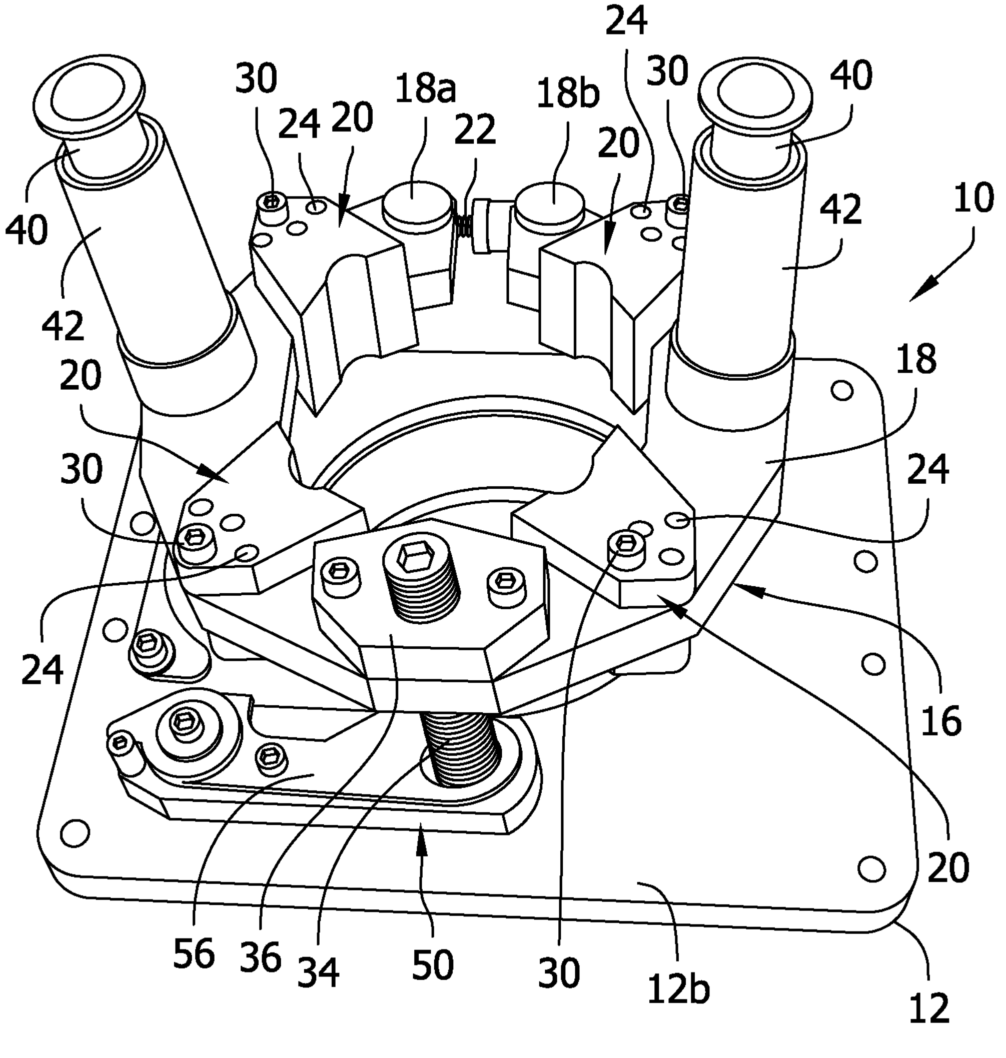
FIG. 3 is bottom perspective of the lift device.

Referring to FIGS. 1, 3 and 4, the clamping device 16 is selectively driven upward and downward relative to the working surface 12*a* by a drive spindle 34 (broadly, a drive shaft) to adjust a vertical position of the router R relative to the tool aperture 14. The drive spindle 34 is threaded and coupled to a carriage nut assembly 36 (includes outer housing and a carriage nut—not shown—in the housing) of the carriage assembly 13 such that rotation of the drive spindle translates into upward and downward linear movement of the clamping device 16. In the illustrated embodiment, the drive spindle 34 and the carriage nut assembly 36 constitute a drive assembly of the lift device 10. The drive spindle 34 has an actuator connector 38 (FIGS. 1 and 2) accessible at the working surface 12*a*. As shown in FIG. 1, a manual crank 39 or other actuator is removably connectable to the actuator connector 38 for actuating rotation of the drive spindle 34. In the illustrated embodiment, the actuator connector 38 is a hex socket for receiving a hex key on the crank 39. The lift device may have a different drive assembly without departing from the scope of the present invention.

Referring to FIGS. 1, 3 and 9, the clamping device 16 moves along a pair of guide posts or rods 40 extending downward from the plate 12. In particular, the carriage assembly 13 includes a pair of guide sleeves 42 secured to the clamping device 16 and slidably received on the guide rods 40 to inhibit canting of the clamping device relative to the working surface 12*a* of the plate 12 during movement of the clamping device. The clamping device 16 may be selectively driven in other way without departing from the scope of the present invention.

Referring to FIGS. 10-13, a spindle-locking mechanism (broadly, a drive-locking mechanism), generally indicated at 50, inhibits unintended rotation of the drive spindle 34 that could cause the vertical position of the tool (e.g., the router bit height) to be undesirably altered. For example, the spindle-locking mechanism 50 is particularly useful when a number of router cuts are made at the same router bit height. The spindle-locking mechanism 50 comprises a cam lock, which includes a camshaft 52, having a cam 54 (FIG. 10B), and a cam linkage 56 coupled to the camshaft. The camshaft 52 is selectively rotatable about its longitudinal axis and includes an actuator connector 58 accessible at the working surface 12*a*. The manual crank 39 or another actuator is removably connectable to the actuator connector for actuating rotation of the camshaft 52. In the illustrated embodiment, the actuator connector is a hex socket for receiving a hex key on the crank 39.

Figure 10:
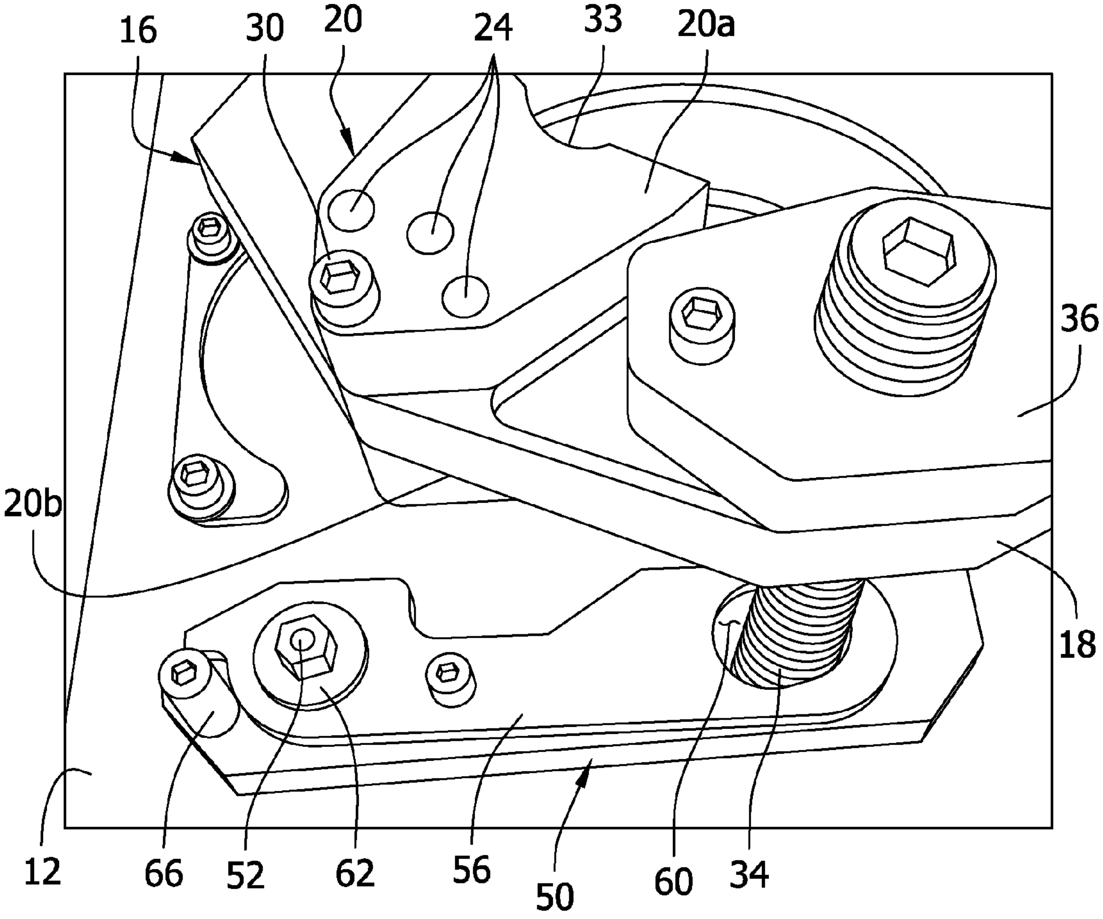
FIG. 10 is fragmentary perspective of the lift device showing a spindle-locking mechanism of the lift device.
Figure 10A:
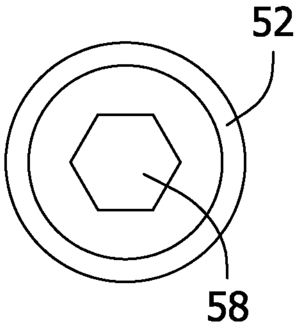
FIG. 10A is a top plan of a cam shaft of the spindle-locking mechanism removed from the lift device.
Figure 10B:
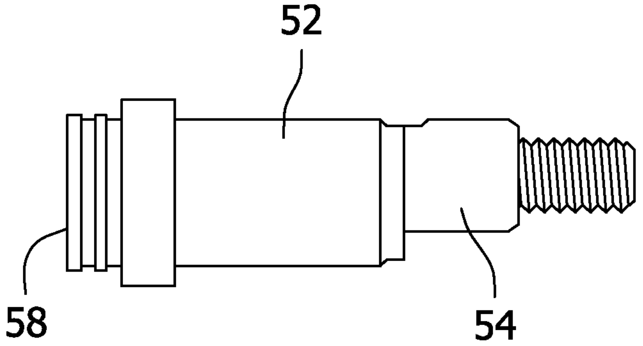
FIG. 10B is a right side elevation of the cam shaft of FIG. 10A.
Figure 11:
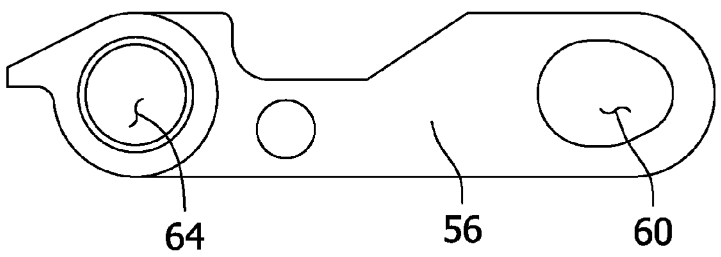
FIG. 11 is a top plan of a cam linkage of the spindle-locking mechanism of FIG. 10.
Figure 12:
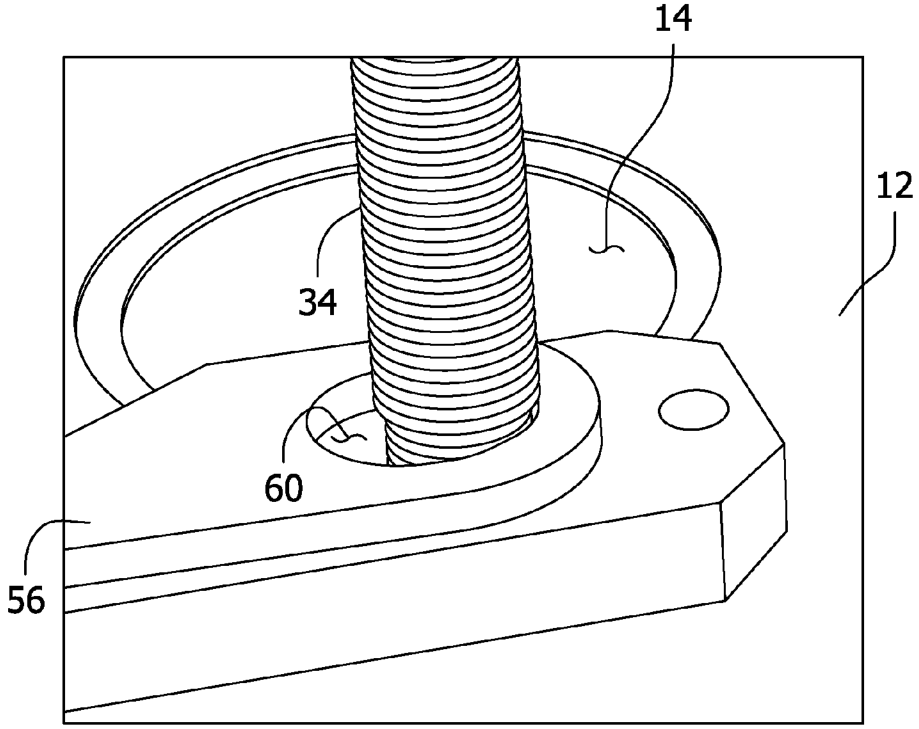
FIG. 12 is an enlarged view showing the cam linkage engaging a spindle of the lift device when the spindle-locking mechanism in a locked position.

Referring to FIGS. 10 and 11, the cam linkage 56 has a first end margin defining a spindle opening 60 through which the drive spindle 34 extends, and a second end margin that is coupled to the camshaft 52, more specifically the cam 54, by a bearing 62 (FIG. 10) received in a bearing opening 64 (FIG. 11). Rotation of the camshaft 52, using the manual crank 39 for example, imparts generally linear movement of the cam linkage 56 to lock and unlock of the drive spindle 34. In the illustrated embodiment, rotation of the camshaft 56 (and the cam 54) in a clockwise direction moves the cam linkage 56 to an engaged position (FIG. 12), in which the cam linkage, at the spindle opening 60, engages the drive spindle 34 to inhibit rotation thereof (i.e., the drive spindle is locked). When the cam linkage 56 is in the engaged position, the camshaft 52 is in an over-center position, and a stop 66 (FIG. 10), in the form of a shoulder bolt in the illustrated embodiment secured to the plate 12, restricts further clockwise rotation of the camshaft 52. Through this arrangement, the camshaft 52 is not freely rotatable, but instead, the camshaft itself is in a locked position when the drive spindle 34 is locked.

Figure 10C:
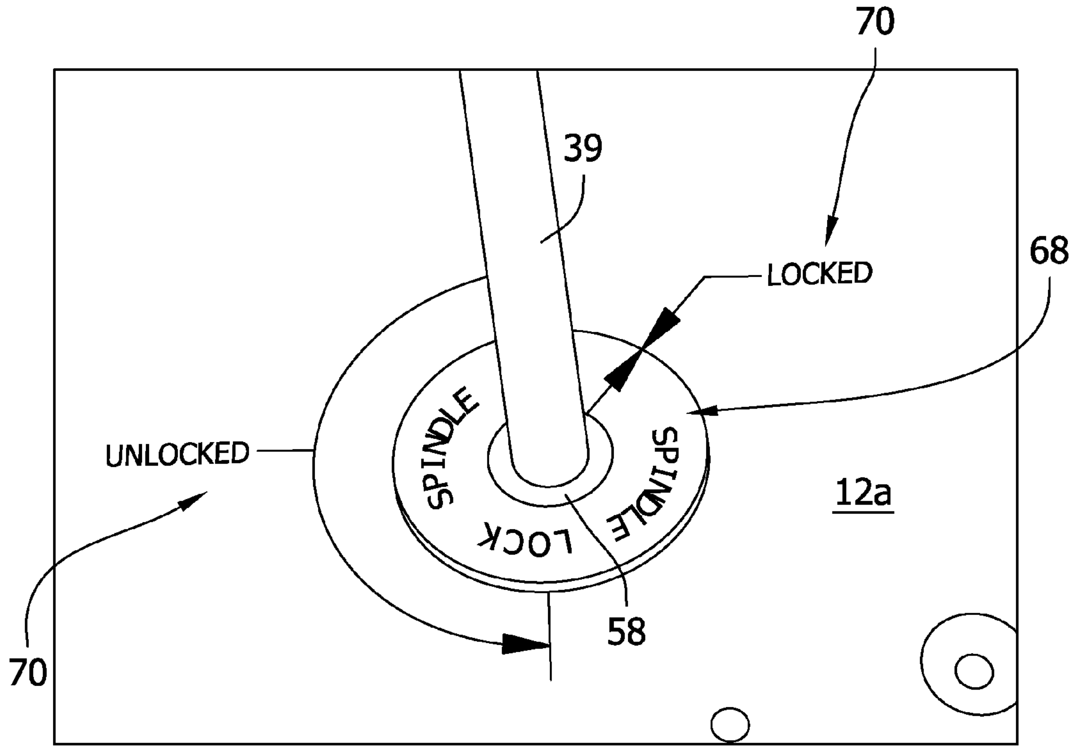
FIG. 10C is an enlarged, fragmentary view of a crank engaging an actuator connector of the cam shaft.
Figure 13:
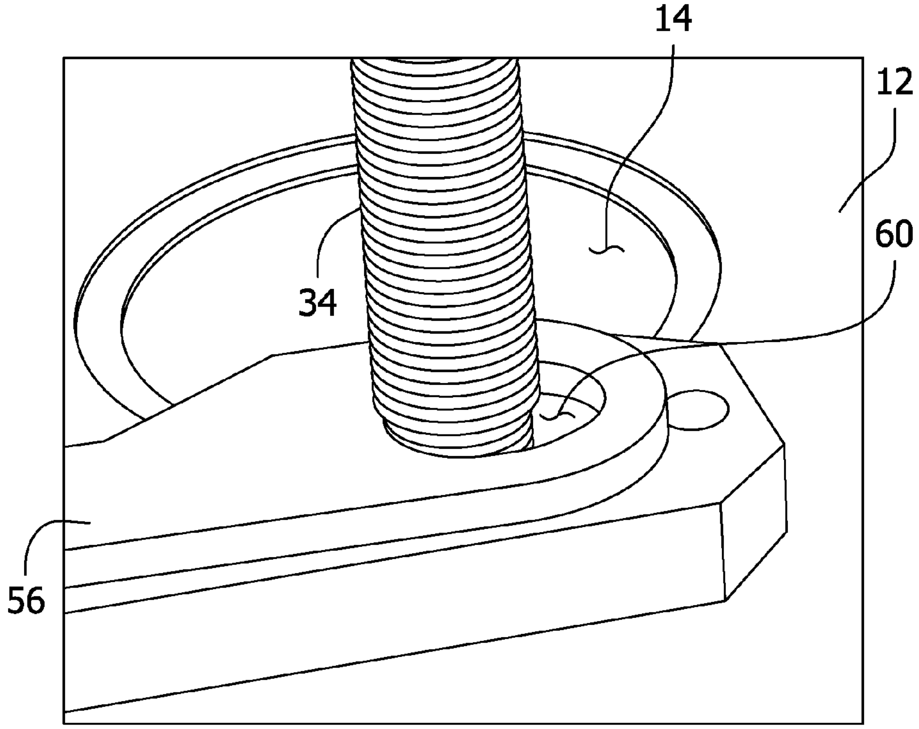
FIG. 13 is an enlarged view showing the spindle-locking mechanism disengaging the spindle of the lift device when the spindle-locking mechanism is in an unlocked position.

Referring to FIG. 13, rotation of the camshaft 52 (and the cam 54) in a counter-clockwise direction moves the cam linkage 56 to a disengaged position, in which the cam linkage disengages the drive spindle 34 to allow rotation thereof (i.e., the drive spindle is unlocked). The cam linkage 56 may still be in contact with the drive spindle 34 in the disengaged position, as shown in FIG. 13, however, the drive spindle is free to rotate (i.e., cam linkage does not engage the drive spindle to inhibit rotation of the drive spindle). Indicia, generally indicated at 68 (FIG. 10C) surrounding the actuator connector 58, and together with indicia, generally indicated at 70 (FIG. 10C) on the working surface 12*a* provide indications for locking and unlocking the drive spindle 34.

The spindle-locking mechanism 50 inhibits unintentional rotation of the spindle 34 during operation of the power tool (e.g., router R). Operation of the power tool typically imparts vibrations to the lift device 10, which can lead to inadvertent rotation of the spindle 34, and unintended vertical movement of the tool. Accordingly, a user may employ the spindle-locking mechanism 50 after adjusting the power tool to the desired vertical location relative to the tool aperture 14 in order to inhibit unintended movement of the power tool relative to the tool aperture. When the user wishes to further adjust the vertical position of the power tool, the user merely unlocks the spindle-locking mechanism using the crank 39, for example, adjusts the vertical position using the same crank, for example, and then again locks the spindle 34 using the crank. It is understood that the lift device may not include the spindle-locking mechanism 50 without departing from the scope of the present invention.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A lift device for selectively adjusting a vertical position of a power tool relative to a working surface of a plate of a work bench, the lift device comprising:

a carriage assembly securable to an underside of the plate, the carriage assembly including a securement mechanism configured to be disposed below the plate when the carriage assembly is secured to the plate, the securement mechanism being selectively adjustable for interchangeably securing a plurality of power tools of different cross-sectional dimensions to the carriage assembly, and a drive assembly for selectively moving the securement mechanism upward and downward along a drive assembly movement axis relative to the plate to adjust the vertical position of the power tool relative to the working surface when the power tool is secured to the carriage assembly;

wherein the securement mechanism is selectively adjustable in a direction transverse to the drive assembly movement axis.

2. The lift device set forth in claim 1, wherein the securement mechanism includes a compression ring securable to the power tool, and a plurality of clamping blocks securable to the compression ring, wherein the clamping blocks are configured to engage the power tool when the compression ring is secured to the power tool, the position of at least one of the clamping blocks on the compression ring is independently adjustable for interchangeably securing the plurality of power tools of different cross-sectional dimensions to the carriage assembly.

3. The lift device set forth in claim 2, wherein each of the clamping blocks includes a plurality of clamping block openings, wherein the compression ring includes sets of compression ring openings spaced apart around the compression ring, at least one set of compression ring openings including plural compression ring openings, wherein each clamping block is selectively movable to a plurality of different clamping positions on the compression ring, such that in each clamping position a selected one of the clamping block openings is aligned with the at least one compression ring opening of said one compression ring openings, wherein a fastener is receivable through the aligned compression ring and clamping block openings to secure the clamping block to the compression ring in selected clamping positions.

4. The lift device set forth in claim 3, wherein each set of compression ring openings includes a plurality of compression ring openings.

5. The lift device set forth in claim 3, wherein each clamping block has opposing upper and lower portions, and a slot between the upper and lower portions, the slot sized and shaped to receive the compression ring therein.

6. The lift device set forth in claim 5, the clamping block openings of each clamping block include a plurality of openings in each of the upper and lower portions, each of the openings in the upper portion being aligned with a corresponding one of the openings in the lower portion.

7. The lift device set forth in claim 6, wherein the openings in the upper portion of each clamping block are through openings, and the openings in the lower portion of each clamping block are threaded openings for threadably receiving the fastener.

8. The lift device set forth in claim 2, wherein each of the clamping blocks includes at least one clamping block opening, wherein the compression ring includes sets of compression ring openings spaced apart around the compression ring, each set of compression ring openings including a plurality of compression ring openings, wherein each clamping block is selectively movable to a plurality of different clamping positions on the compression ring, wherein in each clamping position the at least one clamping block opening is aligned with a selected one of the plurality of compression ring openings of a selected set of compression ring openings, wherein a fastener is receivable through the aligned compression ring and clamping block openings to secure the clamping blocks to the compression ring in selected clamping positions.

9. The lift device set forth in claim 2, wherein each clamping block has an engagement surface for engaging the power tool, and a recess in the engagement surface to provide clearance for a structure on the power tool.

10. The lift device set forth in claim 2, wherein the clamping blocks are secured to and spaced apart around the compression ring, adjacent clamping blocks defining clearance gaps therebetween to provide clearances for a structure on the power tool.

11. The lift device set forth in claim 1, wherein the drive assembly includes a rotatable drive shaft coupled to the securement mechanism for selectively moving the securement mechanism upward and downward relative to the plate, the lift device further comprising a drive-locking mechanism for selectively locking the drive assembly, the drive-locking mechanism including a cam lock for selectively engaging the drive shaft to inhibit rotation of the drive shaft.

12. A lift device for a power tool comprising:

a plate having an upper surface and a tool aperture extending from the upper surface through the plate; and a carriage assembly secured to the plate, the carriage assembly including a securement mechanism disposed below the plate, the securement mechanism being selectively adjustable for interchangeably securing a plurality of power tools of different cross-sectional dimensions to the carriage assembly below the tool aperture, and a drive assembly for selectively moving the securement mechanism upward and downward along a drive assembly movement axis relative to the plate to adjust a vertical position of a power tool relative to the tool aperture when the power tool is secured to the carriage assembly;

wherein the securement mechanism is selectively adjustable in a direction transverse to the drive assembly movement axis.

13. The lift device set forth in claim 12, wherein the securement mechanism includes a compression ring securable to the power tool, and a plurality of clamping blocks securable to the compression ring, wherein the clamping blocks are configured to engage the power tool when the compression ring is secured to the power tool, the position of each of the clamping blocks on the compression ring is independently adjustable for interchangeably securing the plurality of power tools of different cross-sectional dimensions to the carriage assembly.

14. A lift device for a power tool comprising:

a plate having an upper surface and a tool aperture extending from the upper surface through the plate;

a carriage assembly secured to the plate, the carriage assembly including a securement mechanism disposed below the plate for securing the power tool to the carriage assembly below the tool aperture, a drive assembly including a rotatable drive shaft coupled to the securement mechanism for selectively moving the securement mechanism upward and downward relative to the plate to adjust a vertical position of the power tool relative to the tool aperture when the power tool is secured to the carriage assembly; and a drive-locking mechanism for selectively locking the drive assembly, the drive-locking mechanism including a cam lock for selectively engaging the drive shaft to inhibit rotation of the drive shaft.

15. The lift device set forth in claim 14, wherein the cam lock includes a rotatable camshaft and a cam linkage coupled to the camshaft and engageable with the drive shaft to inhibit rotation of the drive shaft, wherein the cam lock is configured so that rotation of the camshaft imparts linear movement of the cam linkage between an engaged position, in which the cam linkage is in engagement with the drive shaft and the drive assembly is locked, and a disengaged position, in which the cam linkage is not engaged with the drive shaft and the drive assembly is unlocked.

16. The lift device set forth in claim 15, wherein the cam linkage has opposite first and second end margins, wherein the camshaft includes a cam coupled to the second end margin of the cam linkage, the first end margin of the cam linkage being engageable with the drive shaft.

17. The lift device set forth in claim 16, wherein the cam linkage has an opening in the first end margin, the drive shaft extending through the opening in the cam linkage.

18. The lift device set forth in claim 15, wherein the camshaft is configured to be locked and not freely rotatable when the cam linkage is in the engaged position and the drive assembly is locked.

19. The lift device set forth in claim 14, wherein the cam lock includes an actuator connector adapted to connector an actuator to the cam lock to selectively actuate the cam lock, wherein the actuator connector is accessible at the upper surface.

20. The lift device set forth in claim 19, wherein the actuator connector is adapted to connect a manual crank to the cam lock to selectively actuate the cam lock.

* * * * *